Patented June 10, 1941

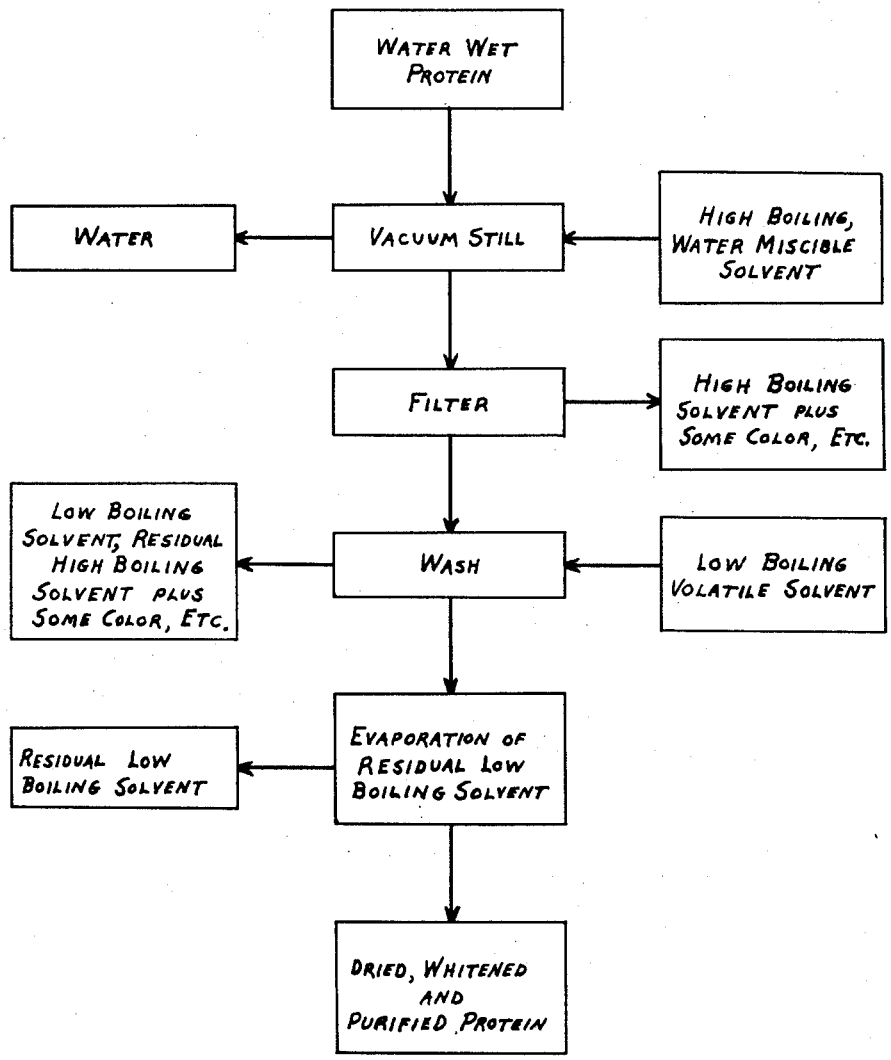

2,244,680

UNITED STATES PATENT OFFICE 2,244,680

METHOD FOR PREPARING PROTEIN MATERIALS

Andrew G. Engstrom and Arthur A. Levinson, Chicago, Ill., assignors to The Glidden Company, Cleveland, Ohio, a corporation of Ohio Application June 8, 1938, Serial No. 212,607

8 Claims. (Cl. 260—112)

The present invention relates to the production of protein materials of improved color, odor, and keeping qualities, and more particularly relates to the drying of proteins whereby the color, odor and keeping qualities are improved.

Various proteins, such as milk casein, vegetable proteins, egg albumen, etc. may be treated according to the present invention. Milk casein, as prepared commercially, while generally of good color, has a dark color when dissolved in alkaline solutions and it has been found that by the present invention, the color of milk casein can be materially improved.

In the commercial production of isolated vegetable proteins from soy beans, it is customary to extract the protein with alkali, after which the protein is precipitated by the addition of acid to a pH corresponding to the isoelectric point of the protein. It is also frequently preferred to subject the extracted protein to a denaturing treatment before precipitation, with lime or equivalent process, according to the Cone and Brown Patent 1,955,375. The isolation of protein by these alkaline processes, however, results in the production of a protein which contains considerable color, a part of which may have been caused by the alkaline treatment. The color of the protein isolated by these procedures has been one of its principal drawbacks, particularly for high grade paper coating films, plastics, etc., where light color, clarity, etc. are important. Other commercially available proteins are subject to similar disabilities.

According to the present invention, a method is provided whereby a large amount of objectionable color is removed from protein materials. The present invention likewise contemplates an improved method of drying protein whereby a large amount of the color is removed.

It has been found that a large amount of the color can be removed from the protein by treating the water wet protein with an organic, water miscible liquid solvent having a boiling point higher than water, and distilling off the water. The excess high boiling organic solvent is then removed, and the entrained solvent is removed from the mixture with a low-boiling solvent. Removal of the last traces of low-boiling solvent is readily effected and the dried material produced is of a color much whiter than the air or heat dried material.

The drawing is a diagrammatic flow sheet illustrating the complete process previously described. The drawing illustrates the use of a vacuum still for removing the water, but it is understood that this type of apparatus is not absolutely essential to the carrying out of the invention as other means for evaporating the water may be employed.

The process is applicable to the drying of the wet precipitates of isolated vegetable protein, freshly precipitated casein, egg albumen, etc., and this method of drying is one phase of the invention.

Example I

According to a preferred procedure, soy bean meal was extracted with alkali and denatured according to U. S. Patent No. 1,955,375. After denaturing, acid was added to the alkaline extract to a pH of 4.6, to precipitate the isolated protein as a curd. This curd was then filtered and washed, the wet curd containing approximately 85% water.

200 grams of butyl carbitol was thoroughly mixed with 200 grams of the wet curd, and the mixture was distilled for 3½ hours at 120–140° F. under a vacuum of 25–28 inches until practically no further condensate formed, indicating that the removal of water was substantially complete. The curd was grainy and was filtered to remove the excess butyl carbitol. The filtered protein was washed well (four times) with ether to remove the residual butyl carbitol and then air dried to remove the residual ether, to yield an isolated protein of not more than 2% moisture content. This isolated protein was very finely divided, white in color, had none of the bad odors of the original protein, and its keeping qualities were much improved over the protein isolated in the same way, but air dried. Substantially all of the color was removed in the butyl carbitol, this solvent being of a definitely yellow color after use. The solvent also removed most of the odors present in the protein.

Example II 860 grams of protein curd prepared as in Example I was thoroughly mixed with 1200 cc. of butyl carbitol, and the mixture distilled at 40° C. under vacuum until no more condensate was formed. The protein was then filtered, and washed with ether until the removal of the butyl carbitol was complete. After air drying to remove the residual ether, a finely divided white protein was produced, substantially identical with that of Example I.

In the previous examples, the wet protein curd has been treated. The invention, however, is not limited to treatment of the wet curd as the dried protein may be treated. The treatment of the wet curd is, however, to be preferred in most cases since it saves a separate step of drying the protein. The following example illustrates the application of the invention to the dried isolated vegetable protein, and is exemplary of the treatment of dry protein materials according to the present invention.

*Example III*

In this example, the dried isolated soy bean protein prepared substantially as described in U. S. Patent 1,955,375, was first wet with water. The water wet protein was then mixed with butyl carbitol in the manner previously described. The mixture was then distilled until the water was substantially completely removed. After filtering, the protein was washed with ether to remove residual butyl carbitol and then air-dried to remove residual ether. The protein was finely divided, white, and in all respects comparable with that of Examples I and II.

When treating the dry protein, it has been found desirable to use sufficient water to thoroughly wet the protein. If the dry protein is treated with the solvent, or if it is not completely wet with water, the removal of color is not as efficient as where sufficient water is used to wet the protein. It is believed that the water enables the high boiling solvent to better remove the color and other impurities. It is believed that the water results in better wetting of the protein by the high boiling solvent, results in soaking and swelling of the protein, and in general provides a greater surface for the action of the solvent in taking up the coloring matter. In any event the water conditions the protein for better removal of the coloring matter by the high boiling solvent.

*Example IV*

15 liters of skim milk was precipitated with 86 cc. of 25% sulfuric acid. The curd was separated into two equal portions, one portion of which was washed and air-dried. The other portion was pressed, and 646 grams of the pressed material (70% moisture content) was mixed with 700 cc. of the acetate of mono-ethyl ether of diethylene glycol, and the mixture distilled at 40° C. under vacuum, until all of the water was removed. The excess solvent was then filtered off on a suction filter. The residual material was mixed with an equal weight of ethylene dichloride and filtered. The material was washed and filtered four times, and the residual ethylene dichloride then removed by vacuum drying. The casein produced was extremely white, being whiter than the air-dried portion. Also, the cloudy appearance present in the air-dried portion had disappeared in the solvent-dried portion.

*Example V*

200 cc. of fresh egg albumen containing 11–12% solids, was mixed with 600 to 800 cc. of the ethyl ether of diethylene glycol, and the water distilled off under vacuum. After filtering off excess high-boiling solvent, the mixture was washed with ether until the excess solvent was all removed. The residual ether was easily volatilized off to give a dried egg albumen of excellent color, odor and keeping qualities.

The treatment of isolated vegetable protein according to the present process results in many improvements in the protein, the marked improvement in color being one of the outstanding ones. However, there are many other improvements, among which may be mentioned improved odor and a marked improvement with regard to resistance to fermentation.

If the protein is used for plastics, a marked increase in transparency in the solvent-treated material over the air-dried or heat-dried protein is to be noticed.

The amount of high-boiling solvent used is preferably sufficient to give a fluid mixture of solvent and protein in order that the final amounts of water may be more easily removed. If the mass becomes stiff upon the removal of water, the last amounts of water are difficult to remove. Various high-boiling solvents may be used, such as ethylene glycol mono-ethyl ether, diethylene glycol mono-ethyl ether, acetate of ethylene glycol mono-ethyl ether, etc., or any organic solvent which is miscible with water and which has a boiling point higher than water. For best results, it is desirable to remove all of the solvent possible.

From the foregoing description it will be apparent to those skilled in the art that the high boiling solvent is not boiled off with the water, since in the preferred embodiment, sufficient high boiling solvent is used to give a fluid mixture after removal of the water and in any case high boiling solvent remains. Of course a small amount may be removed due to the vapor pressure of the solvent, and mechanically due to any bumping, etc.

It will also be apparent to those skilled in the art that the bulk of the high boiling solvent should be removed by filtering or equivalent mechanical means such as centrifuging. If the high boiling solvent were removed by evaporation, for example, there would be no removal of the coloring matter.

The low-boiling solvent used may be any suitable one which is a solvent for the high-boiling solvent. Ether, carbon tetrachloride, ethylene dichloride, hexane, etc. are all suitable low-boiling solvents. The invention is applicable to other proteins and to vegetable proteins or casein prepared in other ways, such as, for example, an acid or salt extracted vegetable protein.

Having described our invention, what we claim as new and desire to secure by Letters Patent is:

1. The process of treating protein material which comprises mixing a water wet protein with a water miscible high boiling organic solvent having a boiling point higher than water, evaporating substantially all of the water from the mixture without substantial evaporation of the high boiling solvent, mechanically separating the bulk of the high boiling solvent from the mixture, and removing the remainder of the high boiling solvent from the protein, the amount of high boiling solvent being sufficient to permit evaporation of substantially all of the water.

2. The process of treating protein material which comprises mixing a water wet protein with a water miscible high boiling organic solvent having a boiling point higher than water, evaporating substantially all of the water from the mixture without substantial evaporation of the high boiling solvent, mechanically separating the bulk of the high boiling solvent from the mixture and washing the residue with a low boiling solvent for the high boiling solvent, the amount of high boiling solvent being sufficient to permit evaporation of substantially all of the water.

3. The process of treating protein material which comprises mixing a water wet protein with a water miscible high boiling organic solvent having a boiling point higher than water, evaporating substantially all of the water from the mixture without substantial evaporation of the high boiling solvent, filtering the bulk of the high boiling solvent from the mixture, and washing the residue with a low boiling solvent for the high boiling solvent, the amount of high boiling solvent being sufficient to permit evaporation of substantially all of the water.

4. The process of claim 1 in which the protein is a vegetable protein.

5. The process of claim 3 in which the protein is soybean protein.

6. The process of claim 3 in which the protein is an isolated soybean protein.

7. The process of claim 3 in which the protein is casein.

8. The process of claim 3 in which the protein is egg albumin.

ANDREW G. ENGSTROM.
ARTHUR A. LEVINSON.